March 23, 1926.

C. LATTA

AIR INTAKE CONTROL FOR CARBURETORS

Filed July 28, 1924

1,577,473

Inventor:
Charles Latta,
His Attorneys.

Patented Mar. 23, 1926.

1,577,473

UNITED STATES PATENT OFFICE.

CHARLES LATTA, OF ST. LOUIS, MISSOURI.

AIR-INTAKE CONTROL FOR CARBURETORS.

Application filed July 23, 1924. Serial No. 728,624.

*To all whom it may concern:*

Be it known that I, CHARLES LATTA, a citizen of the United States, residing at the city of St. Louis, Missouri, have invented a new and useful Air-Intake Control for Carburetors, of which the following is a specification.

This invention relates to control for the air intake of carburetors.

An object of the invention is to provide an accessory or attachment designed and adapted to be attached to and used in connection with certain types of carburetors, whereby the amount of air admitted to the carburetor is automatically controlled and regulated in accordance with the requirements of the conditions under which the engine is operated.

Other objects will appear from the following description, reference being made to the drawing in which—

Figure 1:
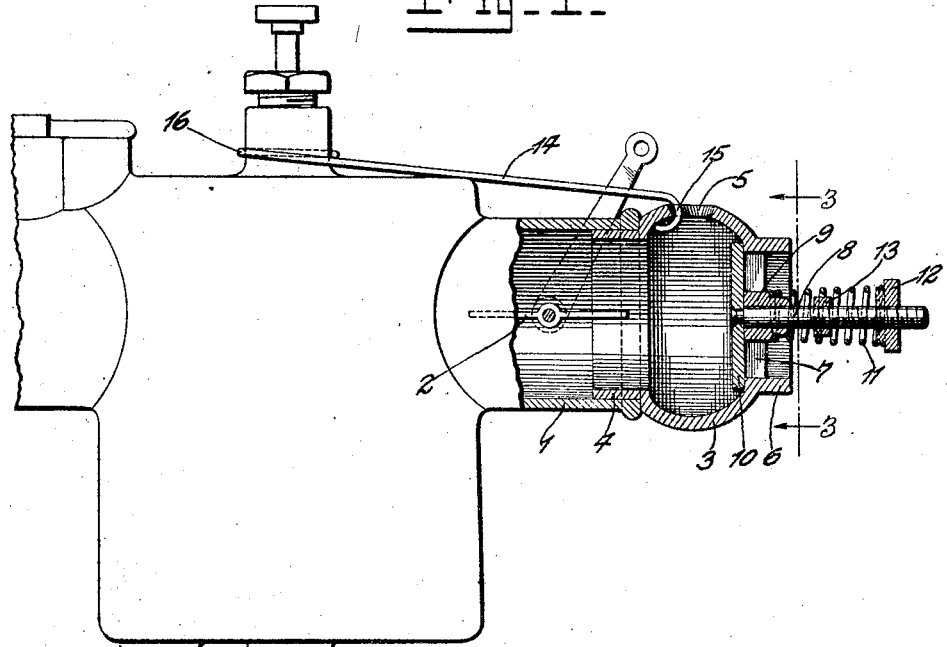
Fig. 1 is a view showing the invention in connection with a carburetor.

The invention is shown as applied to the air intake 1 of a well known type of carburetor in which the familiar butterfly valve 2 is mounted to control and vary the air supply by manual operation.

The present invention is designed to be attached to the outer open end of the carburetor air intake 1 and comprises a hollow globe-shaped portion 3 having a tubular extension 4 at one end which fits snugly within the open end of the intake 1 of the carburetor. One side of the globe 3 has a permanently open hole 5 for the admission of air. The outer end of the globe 3 has a tubular extension 6 crossed by a bearing support 7. A stem 8 operates through the bearing 9 on the support 7 and has a plate valve 10 attached to its inner end within the globe 3 and of larger diameter than the opening through the extension 6, so that when said valve is seated as shown no air can enter through said extension 6. The outer end of the stem 8 is encircled by a spring 11, the inner end of which bears against the part 7 and the outer end of which bears against an adjustable abutment nut 12 screwed on the stem 8. The tension of the spring 11 is exerted to hold the valve 10 closed.

A collar or flange 13 on the stem 8 serves to contact with the outer end of the bearing 9 to limit inward movement of the stem 8 and the valve 10. When the supply of air through the port 5 is insufficient the suction of the engine opens the valve 10 in opposition to the power of the spring 11 and admits the additional supply of air needed.

The device may be secured in connection with the air intake 1 of the carburetor by any well known expedient, or, by a wire 14 having a hook 15 engaging in the port 5 and a loop 16 engaging a fixed part of the carburetor.

Figure 2:
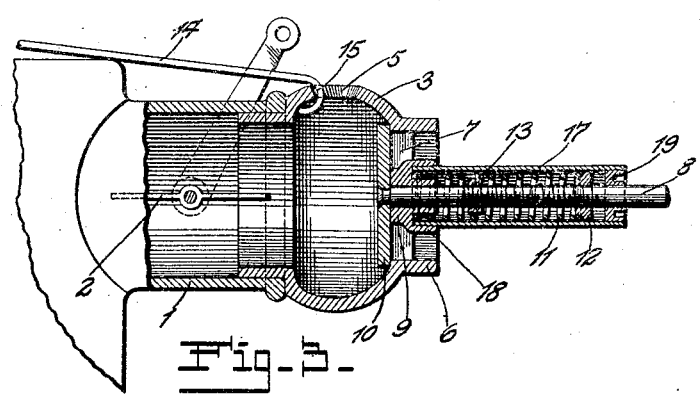
Fig. 2 is a sectional view of a modified form of the invention.
Figure 3:
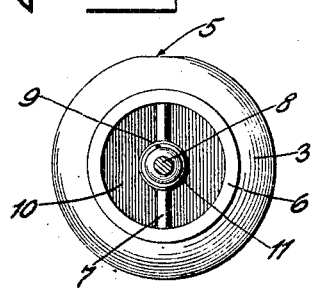
Fig. 3 is a sectional view on the line 3—3 of Fig. 1.

The modified form of invention shown in Fig. 2 is the same as that described, except that a housing is provided for the spring 11 and an additional bearing for the stem 8. As shown in Fig. 2 the cylindrical housing 17 has its inner end screwed into or otherwise secured to a part 18 rigid with the bearing support 7. The nut 12 is slidable in the housing 17 and the outer end of the stem 8 is slidable in a bearing in the end wall 19 of the housing.

What I claim and desire to secure by Letters Patent is:—

1. A device of the character described comprising a hollow member arranged to extend into the air intake of a carburetor and having an external enlargement arranged to bear against the end of the intake and having an air inlet through one side thereof intermediate of its ends and an air inlet to its outer end, a bearing within the outer end of said member beyond said inlet, a stem slidable in said bearing, a valve plate of larger area than said second air inlet attached to the inner end of said stem in said member outwardly from said first named air inlet for closing said second air inlet to said member adjacent to said bearing, and a spring controlling said valve.

2. A device of the character described comprising a globular member having a permanently open air inlet port and an air inlet port to be opened and closed, means for supporting said globular member in connection with a carburetor with both of said ports outside of the carburetor, a bearing supported by said member in said second inlet port, a stem slidable through said bearing, a valve attached to the inner end of said stem to open and to close said second inlet port, a spring encircling said stem and normally holding said valve in closed position and arranged to yield to suction to permit said valve to open, an abutment on said stem arranged to limit inward movement of said stem and valve, a housing enclosing said spring, and an additional bearing in said housing for said stem.

3. A device of the character described comprising a hollow member arranged to extend into the air intake of a carburetor, an external abutment on said member arranged to bear against the end of the intake, a bearing within said member, a stem slidable in said bearing, a valve plate of larger diameter than the internal diameter of the outer portion of said member attached to the inner end of said stem in said member, and a spring for yieldingly holding said valve plate closed and in contact with the wall of said member entirely around said bearing.

4. A device of the character described comprising a hollow member arranged to extend into the air intake of a carburetor, an external abutment on said member arranged to bear against the end of the intake, a bearing within and around the axis of said member, a stem slidable in said bearing, a valve plate of larger diameter than the internal diameter of the outer portion of said member attached to the inner end of said stem in said member, a spring for yieldingly holding said valve plate closed, an abutment for the outer end of said spring near the outer end of said stem and means on said stem between said abutment and said bearing limiting inward movement of said stem.

CHARLES LATTA.